United States Patent
Zorn et al.

(10) Patent No.: US 10,317,539 B2
(45) Date of Patent: Jun. 11, 2019

(54) RADIATION MONITOR BASED ON WAVELENGTH-DEPENDENT OPTICAL ABSORPTION IN FUSED SILICA OPTICAL FIBERS

(71) Applicant: JEFFERSON SCIENCE ASSOCIATES, LLC, Newport News, VA (US)

(72) Inventors: Carl Zorn, Yorktown, VA (US); Andrew Weisenberger, Yorktown, VA (US); Wenze Xi, Ellicott City, MD (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 5 days.

(21) Appl. No.: 15/952,841

(22) Filed: Apr. 13, 2018

(65) Prior Publication Data

US 2018/0299564 A1    Oct. 18, 2018

Related U.S. Application Data

(60) Provisional application No. 62/485,487, filed on Apr. 14, 2017.

(51) Int. Cl.
| | |
|---|---|
| G01T 1/06 | (2006.01) |
| G01T 1/02 | (2006.01) |
| G01T 3/08 | (2006.01) |
| G01T 3/00 | (2006.01) |
| G01T 5/08 | (2006.01) |

(52) U.S. Cl.
CPC ............... G01T 1/06 (2013.01); G01T 1/02 (2013.01); G01T 3/00 (2013.01); G01T 3/08 (2013.01); G01T 5/08 (2013.01)

(58) Field of Classification Search
CPC ............... G01T 1/06; G01T 3/08; G01T 1/02
USPC ................................................... 250/390.03
See application file for complete search history.

(56) References Cited

U.S. PATENT DOCUMENTS

| | | | |
|---|---|---|---|
| 4,385,237 A | 5/1983 | Drukaroff et al. | |
| 5,030,834 A | 7/1991 | Lindmayer et al. | |
| 5,091,653 A | 2/1992 | Creager et al. | |
| 5,606,163 A | 2/1997 | Huston et al. | |
| 5,717,209 A * | 2/1998 | Bigman | G01N 21/359 250/339.12 |
| 6,087,666 A | 7/2000 | Huston et al. | |
| 8,207,861 B2 | 6/2012 | Beinhocker | |
| 9,322,927 B2 | 4/2016 | Lee et al. | |

(Continued)

*Primary Examiner* — David P Porta
*Assistant Examiner* — Gisselle M Gutierrez

(57) ABSTRACT

A radiation monitor apparatus and method based on wavelength-dependent optical absorption in fused silica optical fibers. The radiation monitor uses the radiation induced optical changes in fused silica optical fibers as a way to quantify and differentiate the large doses of radiation from high energy photons and neutrons as well as providing a method to extend the sensitivity over a large dynamic range of doses from 103 to beyond 106 rads. The radiation monitor enables dynamic monitoring of highly ionizing radiation environments. The radiation monitor reduces sensitivity saturation at high dose levels, provides increased sensitivity over a large dynamic range of doses, and enables differentiation between high energy photon and neutron contributions or poor signal to noise.

10 Claims, 3 Drawing Sheets

(56) References Cited

U.S. PATENT DOCUMENTS 9,322,969 B2 * 4/2016 Burov .................. G01N 21/255
2008/0237485 A1 * 10/2008 Beinhocker ............. G01T 1/167
250/474.1

* cited by examiner

RADIATION MONITOR BASED ON WAVELENGTH-DEPENDENT OPTICAL ABSORPTION IN FUSED SILICA OPTICAL FIBERS

This application claims the priority of Provisional U.S. Patent Application Ser. No. 62/485,487 filed Apr. 14, 2017.

The United States Government may have certain rights to this invention under Management and Operating Contract No. DE-AC05-06OR23177 from the Department of Energy.

FIELD OF THE INVENTION

The present invention relates to radiation monitoring devices and more particularly to a radiation monitoring apparatus and method based on wavelength-dependent optical absorption in fused silica optical fibers.

BACKGROUND

Optical fibers have been used and continue to be used for dosimetry. In the late 1970's], optical fibers selected with specific compositions were used in satellites to measure the expected charged particle radiation doses and compare them to models of the environment in Earth orbit. Although radiation monitors based on optical fibers have been proposed, the existing techniques suffer from sensitivity saturation at high dose levels.

Accordingly there is a need for improved radiation monitors to provide dynamic radiation monitoring in high ionizing radiation environments.

Objects and Advantages of the Invention

A first object of the invention is to provide a method to remotely determine radiation dose caused by neutrons and high energy photons (gamma-ray, x-ray) by measuring, using broadband (uv-vis-ir) photon sources (e.g. diode lasers, light emitting diodes) and broadband photon detectors, the optical light attenuation change to doped silica optical fibers. These photodetectors include, but are not limited to, solid state-based photodetectors such as photodiodes, avalanche photodiodes, or Geiger-limited avalanche photodiodes (aka silicon photomultipliers), or vacuum tube-based photomultipliers that use either a dynode electron multiplication chain or a microchannel-based electron multiplication. This can be used with either single-mode or multimode optical fibers with specific methodology applicable to each type.

These effects will be exploited at several wavelengths such as but not limited to 640, 940 and 1310 nm. In addition, radiation may affect other optical phenomena in fibers such as polarization, refractive index, effects on the timing resolution of the light pulses sent through the fiber or transient luminescence during the irradiation. These may also be exploited for dosimetry purposes at some point.

Another object of the invention is to provide a mathematical algorithm enabling, through calibration, the determination of the optical absorption changes based on annealing as a function of time and temperature.

A further object of the invention is to provide an apparatus for monitoring the optical transmissive properties of an optical fiber in a radiation environment.

Another object is to provide an apparatus that monitors the self-annealing process by which an optical fiber recovers its optical transmissive properties after irradiation halts.

Another object is to provide an apparatus that can be used by optical fiber manufacturers to develop optical fibers that are more resistive to radiation.

A further object is to provide an apparatus that can be used by optical fiber manufacturers to develop optical fibers that exhibit improved self-annealing rates.

These and other objects and advantages of the present invention will be understood by reading the following description along with reference to the drawings.

SUMMARY OF THE INVENTION

The present invention is radiation monitor apparatus and method based on wavelength-dependent optical absorption in fused silica optical fibers. The radiation monitor uses the radiation induced optical changes in fused silica optical fibers as a way to quantify and differentiate the large doses of radiation from high energy photons and neutrons as well as providing a method to extend the sensitivity over a large dynamic range of doses from 103 to beyond 106 rads. The radiation monitor enables dynamic monitoring of highly ionizing radiation environments. The radiation monitor reduces sensitivity saturation at high dose levels, provides increased sensitivity over a large dynamic range of doses, and enables differentiation between high energy photon and neutron contributions or poor signal to noise.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

The current invention provides a radiation monitor and method that makes use of the radiation induced optical changes in fused silica optical fibers as a way to quantify and differentiate the large doses of radiation from high energy photons and neutrons. Fused silica optical fibers are well known to have very high radiation tolerances even up to the $10^6$ rad level. As with many optically transmissive materials in the UV-VIS-IR region, the level of optical absorption is a function of wavelength with the UV and blue region suffering the greatest absorption changes as a function of increased dose while the green, red and infrared have smaller levels of absorption in general. In addition, there are also specific absorption bands that can be more sensitive to radiation compared to nearby wavelength regions. As silica fibers have excellent transmission over many meters, this creates an opportunity to monitor radiation dose over a wide range of levels by making use of both the total length of fiber exposed to the radiation, and the choice of optical wavelengths used to monitor the absorption changes.

Figure 1:
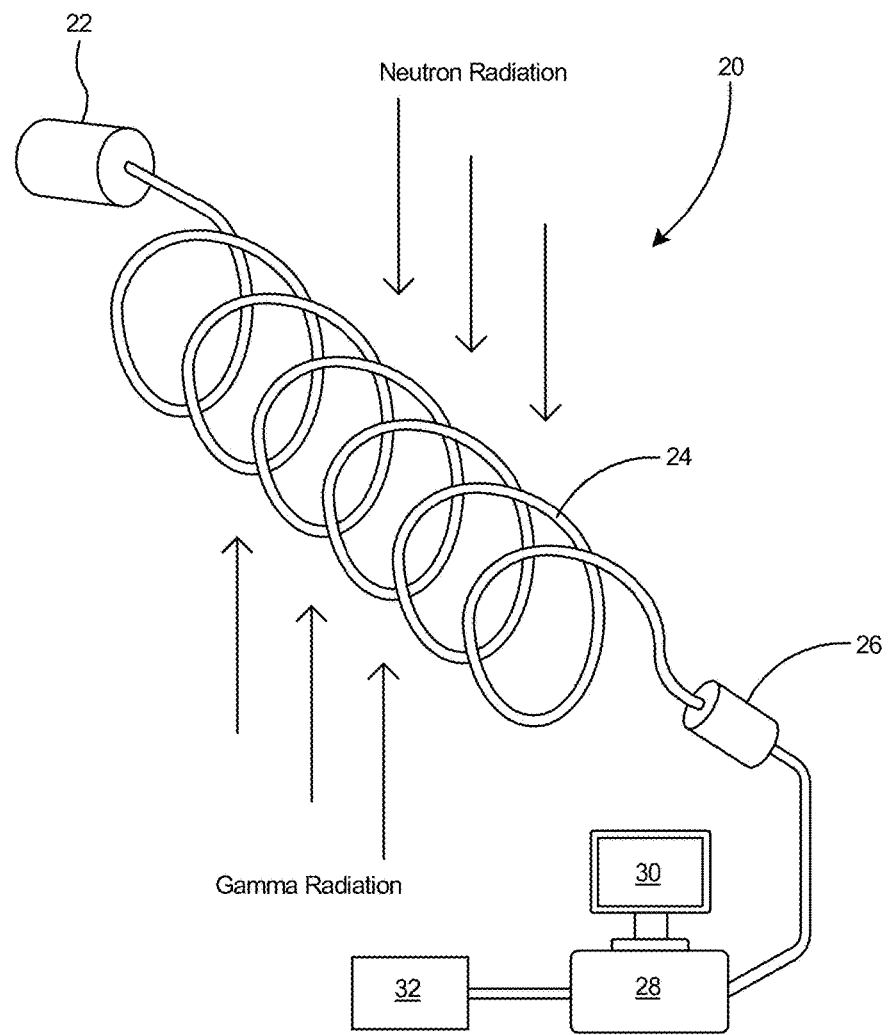
FIG. 1 is a schematic depicting a prior art fiber optic dosimeter used in radiation environment studies.

With reference to FIG. 1, there is shown a radiation monitor 20 according to the invention. Radiation monitor 20 is used for measuring changes in optical attenuation (optical density) in an optical fiber as a function of accumulated dose. The radiation monitor 20 includes a stable photon source 22, such as a light-emitting diode, an optical fiber 24, such as a doped silica optical fiber, and a photon detector 26, such as a photodiode. The photon source 22 provides nearly monochromatic light. The optical fiber 24, having a specific length, is exposed to radiation, such as neutron radiation and gamma radiation, and the transmission of the light signal through the optical fiber 24 is monitored with the photon detector 26. Over time, radiation-induced darkening in the fiber causes the transmission of the signal to decrease. The output signal from the photon detector 26 is transmitted to a microprocessor 28 containing a software program including an algorithm for calculating the optical attenuation changes to the optical fiber 24 induced by the radiation as a function of time and temperature. The optical attenuation changes may be displayed on a monitor 30 or on a recording device 32 such as a printer.

The photon detector 26 is preferably of a type that can detect in the UV, visible range, and/or infrared range and can be a solid state semiconductor type such as a photodiode, an avalanche photodiode, a limited geiger-mode avalanche photodiode (common name: silicon photomultiplier, SiPM, or MPPC), a vacuum tube based photodetector, a dynode-based photomultiplier (either single channel or multichannel), or a microchannel-based photomultiplier (single or multichannel). The stable photon source 22 is preferably a light source that can emit in the same UV, visible or infrared range as the photon detector and can be a solid state semiconductor type such as a light emitting diode (LED) or a laser diode. The optical fiber 24 can be a single mode fiber (only with laser diode as light source) or multimode fibers (with any light source). The preferred embodiment would be a single mode fiber with a laser diode light source and a photodiode photon detector.

The portion of the fiber to be exposed to the high radiation field is wound in a tight spool. The two ends of the fiber are placed in an environment with either no or very low radiation levels. At one end, a light (photon) detector—a photodiode is preferred, but other choices of photodetector are possible where warranted—is placed to monitor the amount of light transmitted through the fiber from a light source—preferably a LED or laser diode. A laser diode is particularly useful as it can be chosen for its emission of a specific wavelength of interest. The laser diode may also be preferred for single mode fibers as these fibers are less likely to change their output depending upon the mechanical handling and layout details of the fiber. Light emitting diodes (LED) may be the preferred light source for multimode fibers. Special care in calibration for the specific mechanical layout of the optical fiber may be necessary as these are more prone to changes in light output during fiber handling. The two choices of detector and light source would be the easiest to implement and most cost effective. It should be noted that the fibers "recover" from the optical damage through a process called annealing.

Annealing is the process by which the fiber recovers its optical transmissive properties after irradiation halts. This process is dependent on the time duration and temperature that the fiber is held at during the annealing process. Optical damage occurs under irradiation through the creation of absorption centers in the fiber material. Even as irradiation occurs self-annealing is occurring but at a much lower rate.

The novelty of this invention lies in the understanding of the annealing process and in the use of the differential effects of neutron and gamma irradiations upon select types of silica-based optical fibers. In this specific case, fluorine doped fibers showed a distinctly different induced attenuation from germanium-doped fibers at 1550 nm when exposed to a mixture of high energy photon and neutrons. In this invention, these effects will be exploited at several wavelengths (640, 940 and 1310 nm) in order to take advantage of the differences occurring at these wavelengths both as a function of dose and as a function of whether the source is from high energy photons or neutrons.

Figure 2:
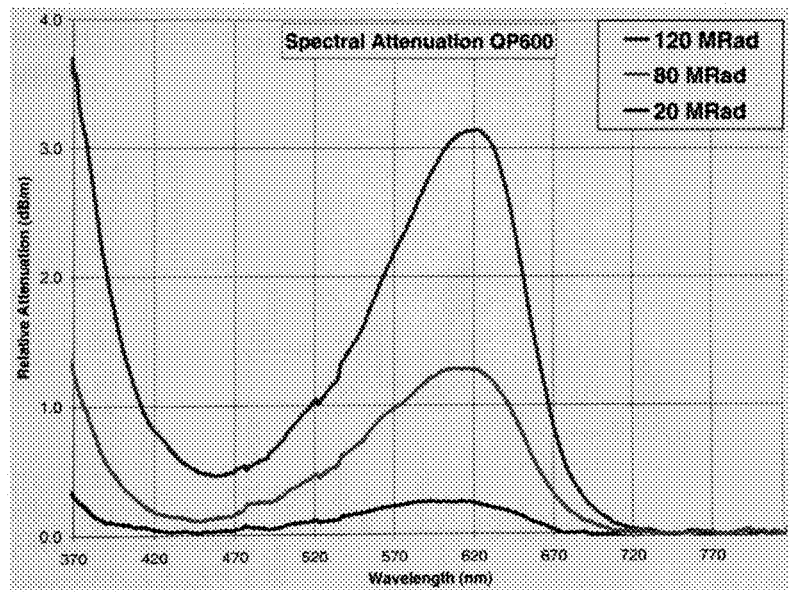
FIG. 2 is a prior art plot depicting radiation induced optical absorption as function of wavelength (long UV to red visible) in silica optical fibers. The plot shows the spectral attenuation of three identical Polymicro optical filters after irradiation to three accumulated doses.

An example of wavelength dependent effects in a silica fiber is shown in FIG. 2. One can see the strong optical absorption in the UV-blue region which would allow one to be sensitive to changes at the lower doses. As one moves to the green, the absorption effects are smaller, allowing monitoring of damage to much higher dose levels. In addition, the actual length of fiber used can be used as method of adjusting the sensitivity to damage to lower or higher dose levels. The strong absorption peak in the red (620 nm) may also be used for greater sensitivity for lower dose levels. The point here is that one has several parameters that could be used to optimize the performance of the radiation monitor.

Such a system requires a calibration which will have to include the annealing effects as well as the differences in induced absorption between high energy gamma and neutron irradiations. The simplest implementation would be to use a blue or UV LED (370-450 nm) as the light source and a photodiode which would generate an electrical current that could be monitored. It is possible that a specific length of fiber (with the irradiated portion wound into a tight spool) would be appropriate so that a very wide dynamic range from 1 Gy to 1 MGy could be used.

Figure 3:
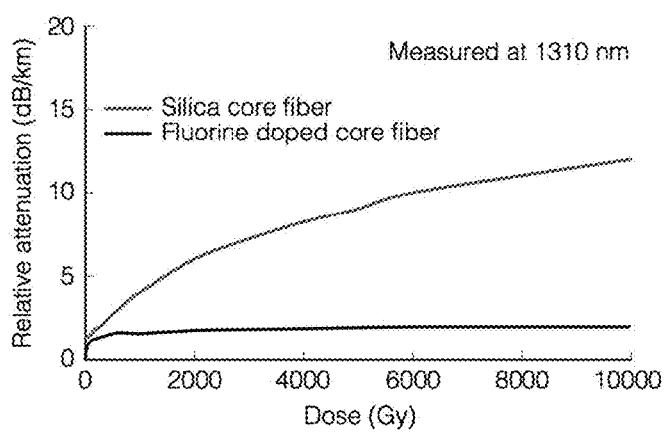
FIG. 3 is a prior art plot depicting radiation resistant behavior in fluorine doped fiber compared to induced absorption in standard silica fiber at infrared wavelength of 1550 µm.
Figure 4:
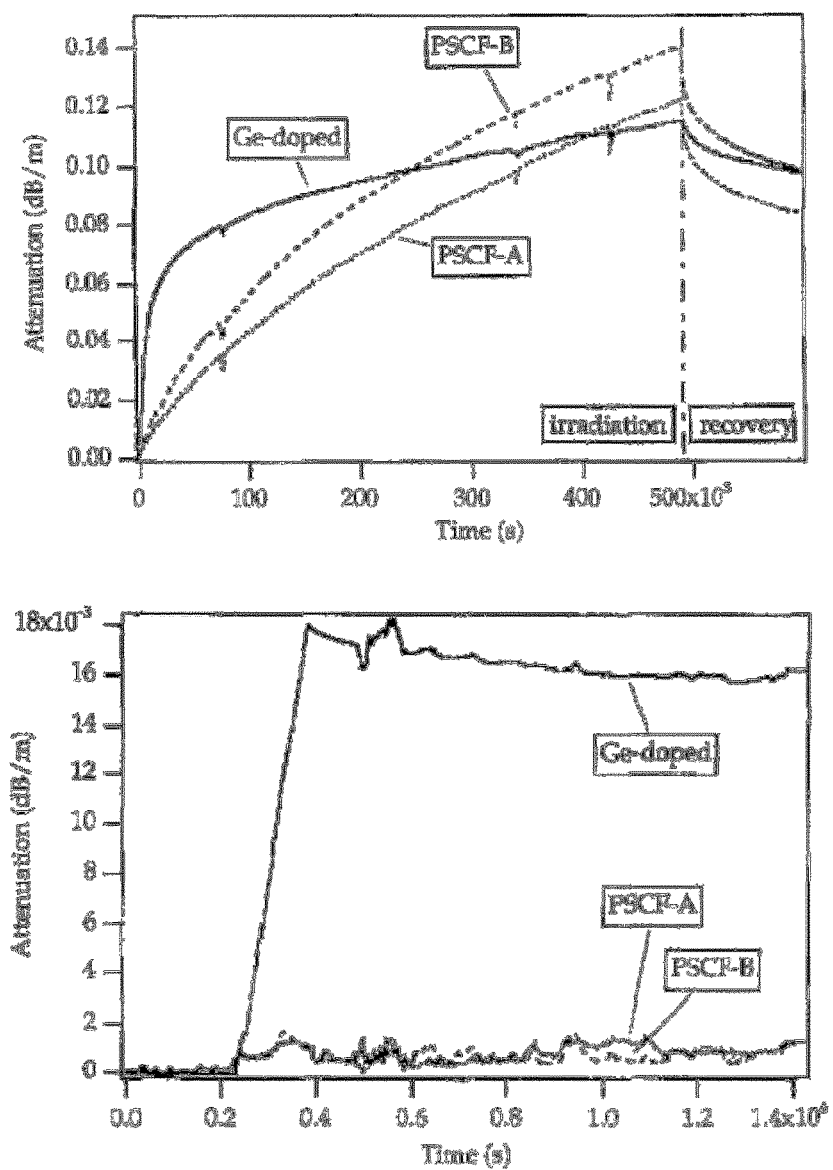
FIG. 4 depicts two prior art plots depicting the observed attenuation changes in germanium doped fiber versus two fluorine doped fibers (PCSF-A and PCSF-B) at 1550 nm.

In regards to differential sensitivity to gamma vs neutron irradiation, there could be some significant wavelength difference in attenuation development, either within a specific kind of fiber, or key differences among a select group of fibers. For a specific fluorine doped silica fiber, high energy gammas produce very little damage in the near infrared (1.3 µm) while there are detectable changes in the UV-VIS region. Hypothetically, if neutron irradiation produced damage in this infrared region, then one would have a differential effect to utilize in distinguishing the effects of gammas and neutrons in a mixed field background. There could be a clear differential in the functional form of the absorption changes as a function of dose (fluence) and wavelength that will separate the effects of neutrons and gammas in a mixed field. FIGS. 3 and 4 show prior art plots depicting the difference in attenuation developed in separate high energy photon and neutron irradiations of two type of silica fiber that use either germanium or fluorine as cladding dopants.

In general terms, the observed induced absorption from a mixed gamma/neutron irradiation can be written as a linear sum:

$$A(\lambda_i, \ell) = A_\gamma(\lambda_i, \ell) + A_N(\lambda_i, \ell)$$

with the gamma (γ) and neutron (N) portions contributing independently. The absorption is both a function of the irradiated length ($\ell$) of the specific fiber and the set of discrete monitored wavelengths $\lambda_i$.

Each of the distinct absorptions can be characterized as a quadratic polynomial:

$$A_{\gamma,N}(x) = \alpha_{\gamma,N} + \beta_{\gamma,N} w(x) + \chi_{\gamma,N} w^2(x)$$

for a specific dose (fluence) x. The three parameters (α,χ) must be determined through a set of calibration measurements. The effects of annealing, both online as a function of dose rate and temperature, or post-irradiation, can be similarly determined.

With reference to FIG. 4, the top plot shows the similar attenuation changes among the fibers curing a cobalt 60 gamma radiation while the bottom plot shows the distinctly different behavior between the fluorine and germanium doped fibers undergoing a high energy (6 MeV) neutron irradiation. This attenuation and annealing behavior will be utilized and expanded upon by exploiting the attenuation changes at three different wavelengths in order to increase the dynamic range and optimize the signal to noise. FIG. 4 depicts two prior art plots depicting the observed attenuation changes in germanium doped fiber versus two fluorine doped fibers (PCSF-A and PCSF-B) at 1550 nm.

The current invention combines the use of several features of silica based optical fibers when exposed to high energy ionizing radiation. First, that radiation creates small but detectable changes in optical absorption as a function of absorbed dose. Second this change is dependent on the wavelength of light being transmitted through the fiber. Third, this change is dependent on specific doping features of the fiber, for example, germanium doping versus fluorine doping. Fourth, the optical absorption for a specific doped fiber is different depending upon whether the ionizing dose is from high energy neutrons or high energy photons. Taken together, this allows one to not only measure the delivered dose, but to also distinguish between the dosage from neutrons and gammas.

According to the invention, care is taken to setup the initial system, mostly based on length and type of fiber exposed to the irradiation, so as to measure quantitatively the correct dynamic range. In this manner, it will be possible to avoid either not being sensitive to low doses (102 to 104 rad) or to avoid saturation at very high doses (>106 rad). The current invention would potentially allow a very large dynamic range (~102->107 rad). A potential intrinsic limitation is the fact that the effects of high energy charged particles (especially hadrons) is not known and may show some distinct behavior different from the effects of high energy photons or neutrons.

Ion chambers of specific configurations could also be used, but suffer from low signal to noise ratios. By choosing between the type of fiber and the length of fiber (wound in a compact spool) exposed to radiation, one can adjust for expected dose levels (kilorads versus megarads) and so optimize the signal to noise.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for remotely determining radiation dose caused by neutrons and high energy photons comprising:
   a photon source, a doped silica optical fiber, and a photon detector;
   transmitting light from the photon source through the optical fiber to the photon detector;
   measuring the intensity of the photons on the photon detector;
   determining the optical attenuation changes to the optical fiber induced by the radiation as a function of time and temperature;
   determining the portion of the optical attenuation changes that are delivered to the doped silica optical fiber by the neutrons;
   determining the portion of the optical attenuation changes that are delivered to the doped silica optical fiber by the high energy photons;
   converting the optical attenuation changes caused by the separate neutron and high energy photon irradiations to a separate dose delivered by each of the neutron and high energy photon components;
   providing a mathematical algorithm for calibrating the measurement of the radiation dose; and
   calibrating the determination of the optical absorption changes based on annealing as a function of time and temperature.

2. The method of claim 1 wherein said photon source comprises a broadband photon source.

3. The method of claim 2 wherein said broadband photon source comprises a diode laser.

4. The method of claim 2 wherein said broadband photon source is selected from the group consisting of ultraviolet photon source, visible photon source, and infrared photon source.

5. The method of claim 1 wherein the neutrons and high energy photons include gamma-rays and x-ray.

6. The method of claim 1 wherein said photon detector comprises a broadband photon detector.

7. The method of claim 1 wherein said doped silica fiber is selected from the group consisting of single mode fiber and multimode fiber.

8. The method of claim 1 comprising:
   said photon source outputs monochromatic light including a wavelength; and
   the wavelength is between 640 nm and 1310 nm.

9. The method of claim 1 comprising:
   determining further radiation induced changes to the optical fiber; and
   the further radiation induced changes to the optical fiber include polarization changes, refractive index alteration, changes in the timing resolution of light pulses sent through the fibers, and transient luminescence during irradiation.

10. The radiation monitor of claim 1 wherein the algorithm comprises:

$$A(\lambda_i, \ell) = A_\gamma(\lambda_i, \ell) + A_N(\lambda_i, \ell)$$

wherein
   $A(\lambda_i, \ell)$ is the total observed induced absorption from a mixed gamma/neutron irradiation;
   $\lambda_i$ is the choice of optical wavelengths used to monitor the absorption changes;
   $\ell$ is the total length of fiber exposed to the radiation;
   $A_\gamma(\lambda_i, \ell)$ is the radiation absorbed from high energy photons; and
   $A_N(\lambda_i, \ell)$ is the radiation absorbed from neutrons.

* * * * *